(12) United States Patent
Clute

(10) Patent No.: US 7,581,757 B2
(45) Date of Patent: Sep. 1, 2009

(54) RETRACTOR WITH PRETENSIONER

(75) Inventor: Gunter K. Clute, Bloomfield Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 508 days.

(21) Appl. No.: 11/222,411

(22) Filed: Sep. 8, 2005

(65) Prior Publication Data

US 2006/0082128 A1 Apr. 20, 2006

Related U.S. Application Data

(63) Continuation-in-part of application No. 10/968,504, filed on Oct. 19, 2004, now Pat. No. 7,318,607, and a continuation-in-part of application No. 11/115,583, filed on Apr. 27, 2005.

(51) Int. Cl.
 *B60R 22/36* (2006.01)
(52) U.S. Cl. ..................................... 280/806
(58) Field of Classification Search ............... 280/807, 280/805, 806; 297/470, 471, 472; 242/379.1, 242/384, 384.2
See application file for complete search history.

(56) References Cited

U.S. PATENT DOCUMENTS

| | | | |
|---|---|---|---|
| 5,344,095 A | 9/1994 | Frei | |
| 5,415,431 A | 5/1995 | Omura | |
| 5,788,281 A | 8/1998 | Yanagi et al. | |
| 5,881,962 A | 3/1999 | Schmidt et al. | |
| 5,938,135 A | 8/1999 | Sasaki et al. | |
| 6,012,667 A * | 1/2000 | Clancy et al. | 242/379.1 |
| 6,105,894 A | 8/2000 | Singer et al. | |
| 6,592,064 B2 | 7/2003 | Clute et al. | |
| 6,616,081 B1 | 9/2003 | Clute et al. | |
| 6,616,186 B1 | 9/2003 | Midorikawa et al. | |
| 6,626,463 B1 | 9/2003 | Arima et al. | |
| 6,641,075 B2 | 11/2003 | Specht | |
| 6,659,505 B1 | 12/2003 | Knox | |
| 6,659,549 B1 | 12/2003 | Still et al. | |
| 6,702,326 B1 | 3/2004 | Fujii | |
| 6,719,325 B2 | 4/2004 | Ingemarsson | |
| 6,726,250 B2 | 4/2004 | Ennerdal | |
| 6,729,649 B1 | 5/2004 | Schmidt | |
| 6,729,693 B2 | 5/2004 | Soderstrom et al. | |
| 6,749,225 B1 | 6/2004 | Clute et al. | |
| 2002/0166914 A1 | 11/2002 | Specht | |
| 2004/0021029 A1 | 2/2004 | Eberle et al. | |

FOREIGN PATENT DOCUMENTS

| | | |
|---|---|---|
| DE | 10122910 B4 | 10/2004 |
| EP | 1415872 A1 | 5/2004 |
| WO | WO 03/082640 A1 | 10/2003 |
| WO | WO 2004/065181 A1 | 8/2004 |

* cited by examiner

*Primary Examiner*—Faye M. Fleming
(74) *Attorney, Agent, or Firm*—Sally J Brown; Brinks Hofer Gilson & Lione

(57) ABSTRACT

A retractor includes a pretensioner whereby increased control and variation over the load limitation characteristics of the retractor are provided. The seat belt and spool are linked to a locking mechanism through a first force limiting element, while the pretensioner is linked to the seat belt and spool through a second force limiting element. Both the first and second force limiting elements are employed during a load limiting phase of the retractor.

21 Claims, 5 Drawing Sheets

RETRACTOR WITH PRETENSIONER

CROSS-REFERENCE TO RELATED PATENT APPLICATIONS

This patent application is a continuation-in-part of corresponding U.S. patent application Ser. No. 10/968,504, filed Oct. 19, 2004 now U.S. Pat. No. 7,318,607, and is also a continuation-in-part of corresponding U.S. patent application Ser. No. 11/115,583, filed Apr. 27, 2005. All of the foregoing applications are hereby incorporated by reference in their entirety.

FIELD OF THE INVENTION

The present invention relates generally to seat belt restraint apparatus for restraining an occupant of an automobile, and more particularly relates to a retractor having a pretensioner for controlling load limitation aspects of the restraint system.

BACKGROUND OF THE INVENTION

Seat belt restraint systems for automobiles often include a pretensioner which is structured to apply tension to the seat belt when an impact event such as an accident situation is detected. When the pretensioner is activated, the pretensioner eliminates any slack in the seat belt, and thus controls the physical space between the occupant and the seat belt. In this manner, the occupant of the seat is coupled with the seat belt as the occupant initially moves forward relative to the seat, thereby controllably restraining the occupant, reducing occupant excursion, and preventing undue loads when the occupant moves forwardly into the seat belt.

A retractor is another standard component of a seat belt restraint system which includes a spool receiving the webbing material of the seat belt. The spool is used to wind up and store the webbing. Generally, the spool is locked in place upon detection at an impact situation in order to restrain the occupant via the seat belt. Recently, retractors have been designed having one or more force limiting elements which are structured to allow the spool to rotate and pay out the webbing material of the seat belt upon reaching predetermined force levels between the occupant and seat belt. In this manner, the restraint force imposed on the occupant can be limited in a controlled manner, thereby providing a certain load limitation characteristics.

Despite these and other improvements to automobile restraint systems, there remains a need to provide a retractor that includes a pretensioner while providing increased control and variation over the load limitation characteristics of the restraint system.

BRIEF SUMMARY OF THE INVENTION

The present invention provides a retractor having a pretensioner that provides increased control and variation over the load limitation characteristics of the restraint system. The retractor generally includes a spool receiving a portion of the seat belt wound thereon, which is rotatable to retract or pay out the seat belt. A first force limiting element is connected to the spool, and a locking mechanism is operatively connected to the spool through the first force limiting element to prevent paying out of seat belt, such as during an impact event. However, the first force limiting element provides some limited paying out of the seat belt in order to control the belt forces imposed on the occupant. A second force limiting element is connected to the spool. The pretensioner has a drive mechanism operatively connected to the spool through the second force limiting element. The retractor is operable in at least two modes upon detection of an impact event, including a first load limiting mode and a second load limiting mode. In the first mode, the locking mechanism is activated to limit belt force through the first force limiting element. In the second mode the drive mechanism of the pretensioner is activated to retract seat belt onto the spool and blocked to limit force through the second force limiting element, and the locking mechanism is activated to limit belt force through the first force limiting element.

According to more detailed aspects, the second load limiting mode includes a pretensioning phase wherein the drive mechanism of the pretensioner rotates the spool to retract the seat belt, and a load limiting phase wherein the drive mechanism is blocked throughout the entire load limiting phase. The pretensioner drive mechanism substantially maintains its position throughout the entire impact event. The load limitation of the first and second force limiting elements are superimposed during the entire second load limiting mode. The first load limiting mode provides low load limitation, while the second load limiting mode provides either high constant load limitation or degressive load limitation as determined by the construction of the second force limiting element. Preferably the first and second force limiting elements are torsion bars that twist under a predetermined load.

According to still further detailed aspects, the pretensioner drive mechanism may be an electric motor or may include a pyrotechnic charge. When an electric motor is used, the second load limiting element is capable of transmitting a predetermined amount of force, and the motor maintains a drive force about equal to the predetermined amount of force during the load limitation phase. Alternatively, the drive mechanism may include a one-way locking element. The one-way locking element is activated only upon activation of the drive mechanism, and preferably includes a spring biased lever. The one-way locking element may be originally maintained in an unlocked position by a retaining tap whereby activation of the drive mechanism causes a moving element to engage the retaining tap and release the one-way locking element to its locked position.

According to another embodiment of the present invention, a method for restraining an occupant of an automobile is provided. The method includes steps of providing a retractor having a pretensioner, preferably of the construction noted above. The method further includes steps of activating the drive mechanism of the pretensioner upon detection of an impact event to retract the seat belt onto the spool, and maintaining the position of the drive mechanism of the pretensioner to provide load limitation via the second force limiting element.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
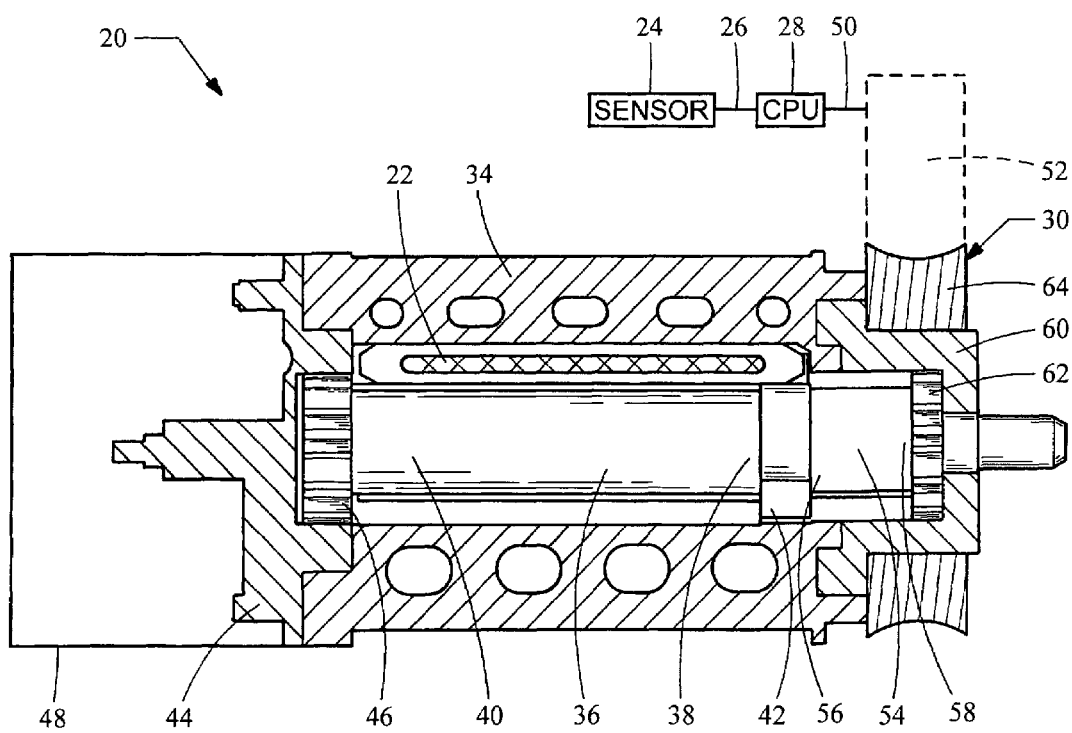
FIG. 1 is a cross-sectional view of a retractor constructed in accordance with the teachings of the present invention.

Turning now to the figures, FIG. 1 depicts a cross-sectional view of a retractor 20 constructed in accordance with the teachings of the present invention. The retractor 20 is adapted for an automobile having a seat belt 22 restraining an occupant (not shown). As is known in the art, the vehicle includes an impact sensor 24 sending a signal 26 indicative of an impact event such as a crash event. Any impact sensor that is or will be known to those skilled in the art may be readily employed in conjunction with the retractor 20 of the present invention. An electronic control unit 28 such as a central processing unit (CPU) or other controller receives the signal 26 and controls the vehicle's response to the same.

Generally, the retractor 20 includes a pretensioner 30 formed with the retractor 20. As is known in the art, during normal use the retractor 20 is used to wind up the seat belt 22 about a spool 34. The spool 34 is coupled to a first force limiting element 36, which preferably comprises a torsion rod or torque bar, as is also known in the art. It will be recognized that other types of force limiting elements other than torsion rods may be employed in conjunction with the present invention, including sleeves, rings or tubes. The first force limiting element 36 generally includes a first end 38 and a second end 40. The first end 38 is connected to the spool 34 via a coupling 42, while the second end 40 is connected to a profiled head 44 via another coupling 46. Preferably, the coupling 42 is constructed as a low-profile spline as disclosed in U.S. patent application Ser. No. 11/008,308 filed Dec. 9, 2004, the disclosure of which is incorporated herein by reference in its entirety.

The retractor 20 further includes an end assembly 48 which includes a locking mechanism that selectively engages the profiled head 44 and second end 40 of torsion bar 36 during an impact event such as a vehicle collision, providing an "emergency locking retractor" function as is well known in the art. For example, end assembly 48 is of the type disclosed in U.S. Pat. Nos. 6,616,081; 6,012,667; and 5,924,641, the disclosures of which are hereby incorporated by reference in their entirety. Through blocking of the profiled head 44, the spool 34 is prevented from rotating and the occupant is restrained by the seat belt 22. However, the retractor 20 and first force limiting element 36 also provide a low load limitation function in order to limit the restraint force imposed on the occupant. Upon reaching a predetermined restraint force, the spool 34 will begin to rotate and "pay out" the seat belt 22 by actuation of the first force limiting element 36. That is, upon reaching a predetermined force, the torsion rod 36 will twist to allow some rotation of the spool 34 (as well as coupling 42 and first end 38) relative to the profiled head 44 (and hence relative to coupling 46 and second end 40) which is fixed by the locking mechanism of end assembly 48. In this manner, a first load limitation characteristic is provided by the torsion of the first force limiting element 36 to allow limited pay out of the seat belt 22 wound on the spool 34.

Also shown in FIG. 1, the pretensioner 30 is provided for pretensioning the seat belt 22 through the retractor 20. The pretensioner 30 is activated by the electronic control unit 28 via a pretension signal 50. In particular, a drive mechanism 52 is actuated to effectuate rotation of the spool 34 via a second force limiting element 54. A first end 56 of the second force limiting element 54 is connected to the spool 38 via the shared coupling 42, although it will be recognized that the first end 56 may be directly attached to the spool 34 or include its own coupling. The second end 58 of the second force limiting element 54 is connected to an end cap 60 via a coupling 62. The end cap 60 is rotatable relative to the spool 34, and the friction therebetween is controlled by design, as discussed further herein. A pinion 64 is connected between the end cap 60 and the drive mechanism 52, whereby the clutch 64 selectively engages the end cap 60 upon activation of the drive mechanism 52.

It will be recognized by those skilled in the art that while the first ends 38, 56 of the first and second force limiting elements 36, 54 are located adjacent each other and are rigidly connected to the spool 34, the second force limiting element 54 and the pretensioner 30 could be connected to the second end 40 of the first force loading element 36, and more specifically connected to the profiled head 44. It will also be recognized that the first and second load limiting elements 36, 54 may be formed out of a single torsion bar wherein the opposing free ends of the bar would be selectively blocked (either via the locking mechanism or the pretensioner drive 52) to cause load limitation through the force limiting elements 36, 54. Further, the second force limiting element 54 could be a hollow tube which slides around a reduced diameter end of the torsion rod 36 forming the first force limiting element 36.

The retractor 20 is operable in at least two modes upon detection of an impact event. In a first load limiting mode, the pretensioner 30 is not activated while the tread head 44 is blocked by the locking element of end assembly 48. Accordingly, rotation of the spool 34 is blocked through the first load limiting element 36 and tread head 44, providing a first load limitation characteristic described further below. In a second load limiting mode, the pretensioner 30, and particularly its drive mechanism 52, is activated in addition to the blocking of the tread head 44. Accordingly, rotation of the spool 34 in the second mode is blocked through both the first and second load limiting elements 36, 54, providing a second load limitation characteristic also described further below.

The second load limiting mode includes a pretensioning phase and a load limiting phase. In the pretensioning phase, the slack between the seat belt 22 and the occupant is removed. In the load limiting phase, a limited amount of seat belt 22 is paid out in order to control the level of belt force imposed on the occupant during the crash event. Upon determination of an impact event, either via the crash sensor 24 or a separate sensor incorporated into the pretensioner 30, the drive mechanism 52 drives the pinion 64 and end cap 60 to rotate the second force limiting element 54, which in turn rotates the spool 34 in a direction to wind up the seat belt 22 and remove any slack between the occupant and the seat belt 22. The second force limiting element 54 is preferably designed as a torsion rod, and preferably is capable of transmitting the pretentioning force from the drive mechanism 52 without significant deformation, although this is not required and the second torsion rod 54 may be partially deformed (i.e. loaded) during pretensioning.

In the load limiting phase of the second mode, after activation of the pretensioner 30 and in addition to blocking the tread head 44 to employ the first force limiting element 36, the end cap 60 is held in place such that any rotation of the spool 34 to pay out seat belt 22 will require deformation of the second load limiting element 54 (i.e. rotation of the coupling 42 and first end 56 relative to the coupling 62 and second end 58). When both the profiled head 44 and the end cap 60 are held in place, a second load limitation characteristic is provided through the combination of first force limiting element 40 and second force limiting element 50, which in this embodiment are superimposed.

Figure 2:
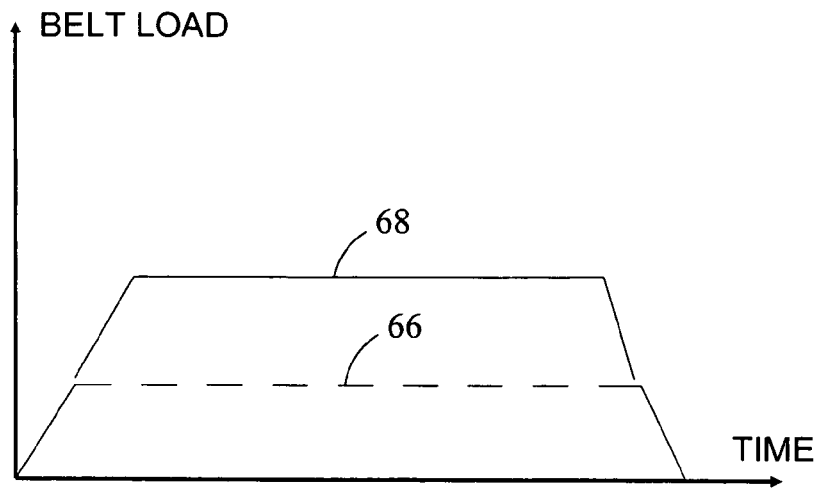
FIG. 2 is a graph depicting the belt load over time in the retractor of FIG. 1.
Figure 3:
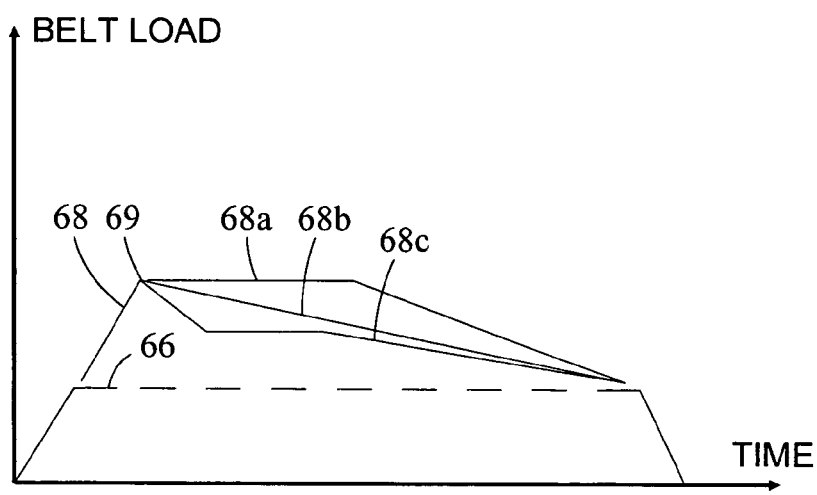
FIG. 3 is another graph depicting the belt load over time in the retractor of FIG. 1.

The load limitation characteristics provided by the retractor 34 and pretensioner 30 will now be described with reference to the graphs depicted in FIGS. 2, 3 and 4 which present idealized data. In the figures, the Y-axis represents belt load while the X-axis represents time, and in FIG. 2 the dotted line 66 represents the low constant load limitation characteristic (preferably in the range of 2 kN to 3 kN) obtained when the pretensioner 30 is not activated, and hence the second force limiting element 58 is not effective, since both its ends 56, 58 are free to rotate. When the pretensioner 30 is activated, both the first and second force limiting elements 36, 54 are employed (since the pretensioner 30 blocks end 58 of the second force limiting element 54) to control the pay out of seat belt 22 by rotation of the spool 34, and thus a second load limitation characteristic is provided and is indicated by line 68 in the graph of FIG. 2. Thus, the second load limitation characteristic 64 shows a high constant load limitation which is preferably in the range of 5 kN to 6 kN.

It will be recognized by those skilled in the art that by employing two force limiting elements 36, 54, various other load limit characteristics may be achieved. In FIG. 3, the second load limitation characteristic 68 is provided with degressive load limitation. In particular, after reaching a predetermined belt load at point 69, the second load limitation characteristic 68 begins to decrease in any one of a number of manners, some of which are shown as lines 68a, 68b and 68c. In order to provide this degressive load limitation, the second force limiting element 54 may be provided with various shapes or constructed of various materials which result in degressive load limits over time.

Figure 4:
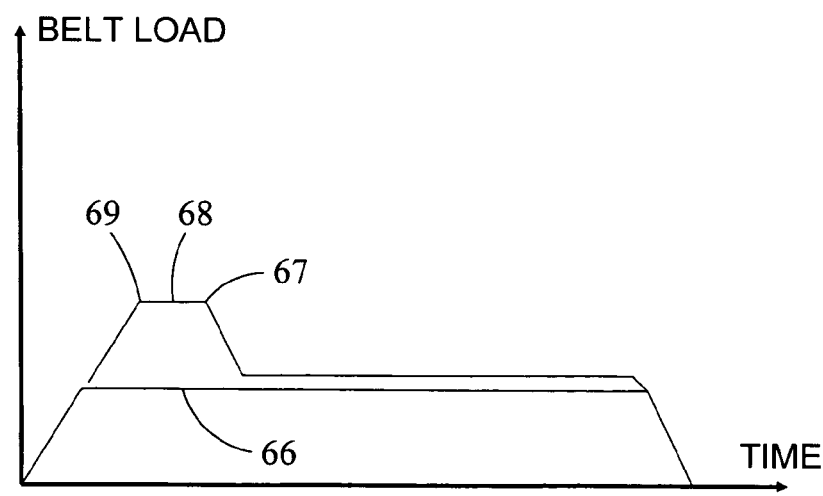
FIG. 4 is yet another graph depicting the belt load over time in the retractor of FIG. 1.

Similarly, and as shown in FIG. 4, the second force limiting element 54 may be superimposed on the first force limiting element 36 until a pre-selected number of spool rotations are reached. Then, the second force limiting element 54 is decoupled from the spool 34, preferably by shearing off the coupling 62 (or even the coupling 42), or alternatively by designed failure of the second force limiting element 54. In this manner, the second load limitation characteristic 68 will follow its standard course to a predetermined belt load 69, which will be maintained for a period of time and/or a number of spool rotations until point 67, at which time the limitation on the belt load will be reduced to a level close to the force level provided by the first load limitation characteristic 66. The difference between the first and second load limitation characteristics 66, 68 beyond point 67 represents the level of friction between the end cap 60 and spool 33, which may be designed to provide a specific amount of load limitation. More specifically, the pretensioner 30 and its drive mechanism 52 are still blocked, resulting in relative rotation between the end cap 60 and the spool 34. In this manner, a degressive load limitation may be provided for the second load limitation characteristic 68 via the second force limiting element 54, which is disconnected upon a predetermined number of spool rotations. It will also be recognized that a progressive load limitation could also be provided through design of the force limiting elements.

Figure 7:
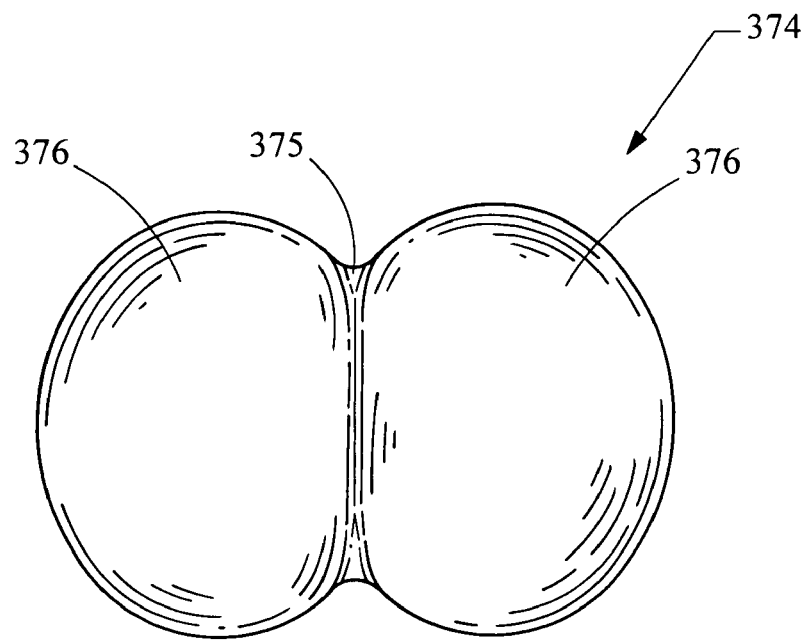
Figure 8:
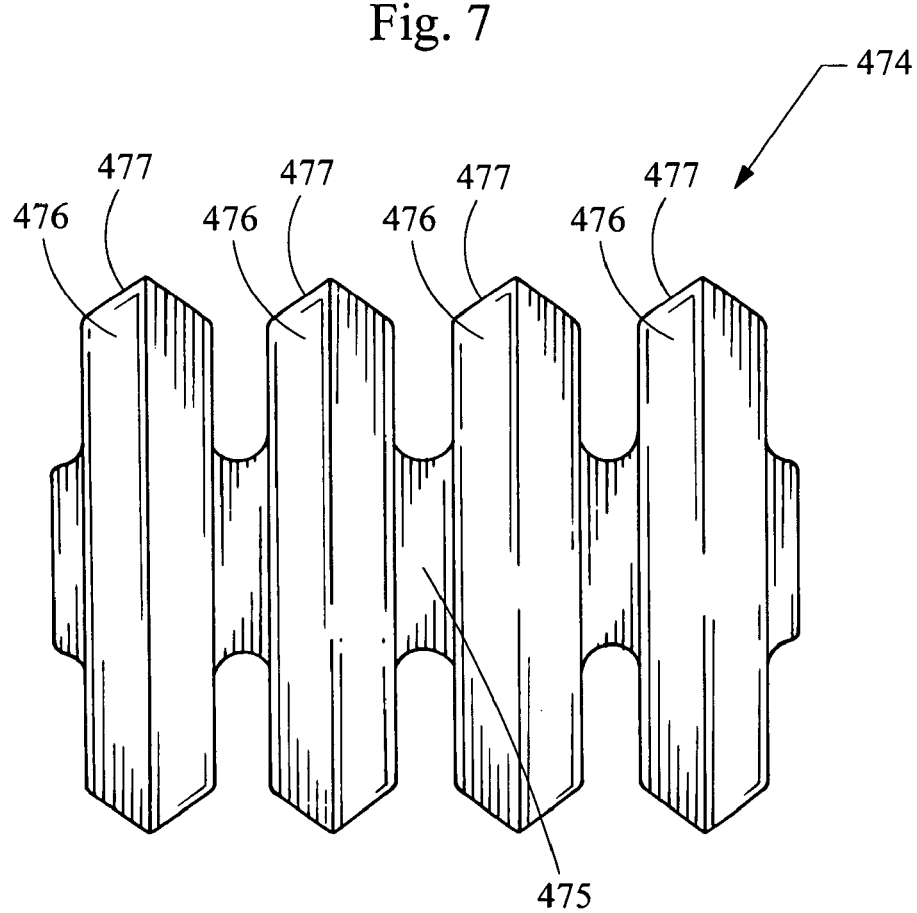

The present invention contemplates that various pretensioner devices and drive mechanisms may be coupled to the retractor 20 to provide pretensioning of the seat belt 22 and activation of the second force limiting element 54. For example, the pretensioner may be an electric motor or may be of the type having a driving mechanism that includes a pyrotechnic charge. One exemplary pretensioner is described in U.S. Pat. No. 5,881,962, the disclosure of which is incorporated by reference herein in its entirety. Generally, ignition of the pyrotechnic charge or other combustible material creates a pressure in a chamber, which forces motion in a driving element such as a piston, rack, or series of elements such as balls. The driving element moves past a rotatable pinion or other force transmission device that is attached to the spool having the seat belt wound thereon, thereby causing retraction of the seat belt to remove slack between the belt and the occupant. After ignition, pressure in the chamber is maintained, such that the continued engagement of the driving element and the force transmission device (i.e. pinion) blocks any further protraction of the seat belt. Preferably, the pressure in the chamber is maintained by employing a driving element having specially designed sealing rings, examples of which are shown in FIGS. 7 and 8. In FIG. 7, the driving element 374 includes a core 375 and two arcuate sealing rings 376, while in FIG. 8 the driving element 474 includes a core 475 multiple sealing rings 476 having tapered ends 477. Accordingly, it can be seen that the normal blocking of a pyrotechnic pretensioner used in the retractor 20 of the present invention results in the blocking of one end of the second force limiting element 54, thereby affecting the load limitation characteristics.

Figure 5:
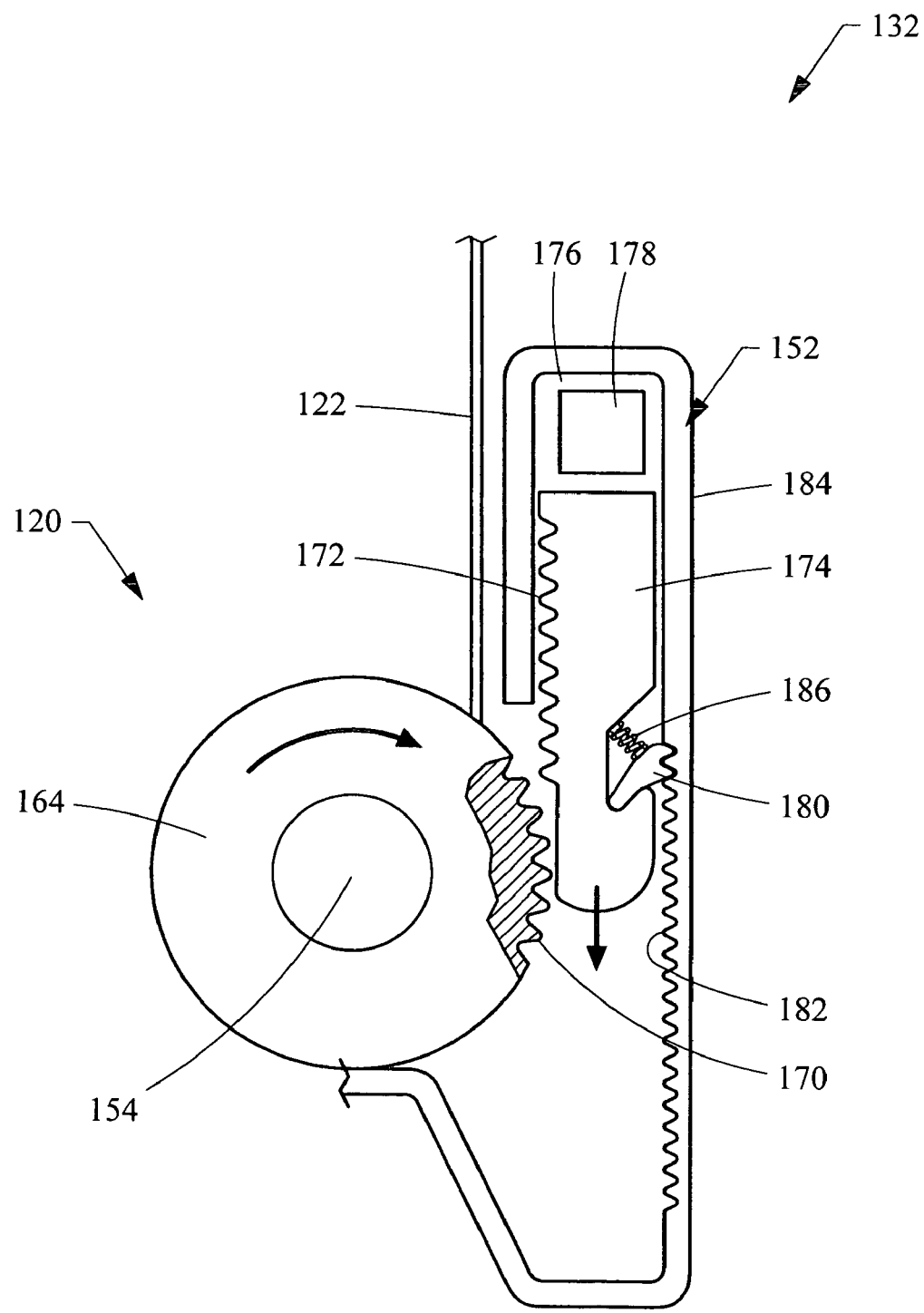
FIG. 5 is a schematic view, partially in cross-section, of another embodiment of the retractor constructed in accordance with the teachings of the present invention.

It will also be recognized that additional means may be provided to assist in blocking the pretensioner. For example, and with reference to FIG. 5, an alternate embodiment of the retractor 120 is shown, schematically, including a pyrotechnic pretensioner device 130 constructed in accordance with the teachings of the present invention. Pretensioner 130 is coupled to the second force limiting element 154 via a pinion 164. The pinion 164 includes a plurality of teeth 170 which cooperatively engage teeth 172 on a pretensioner rack 174. It will be recognized that the teeth 170 do not initially engage teeth 172, thereby allowing the pinion 164 to freely rotate during normal operation. Alternatively, a clutch could be employed between the pinion 164 and the second force limiting element 154.

A drive mechanism 152 includes a combustion chamber 176 having a pyrotechnic charge 178 or other combustible material provided adjacent the rack 174, as is well known in the art. Upon activation of the pyrotechnic charge 178, the material expands to force the rack 174 linearly, in a downward direction in the figure as indicated by the lined arrow. The linear translation of the rack 174 is converted to a rotational movement of pinion 165 by the meshing engagement of teeth 170 of pinion 165 with teeth 172 of pretensioner rack 174. As pretensioner rack 174 is driven downward, pinion 165 is rotated in a direction indicated by the curved line arrow, thereby causing rapid winding of seat belt 122 onto the spool and hence pretensioning the seat belt 122.

In order to assist in the activation of the second force limiting member 154 during the load limiting mode of the retractor 120, the pretensioning rack 174 further includes a rack lock member 180. Rack lock member 180 is configured to engage one of a plurality of notches 182 disposed in housing 184 of pretensioner 132. A spring 186 is provided between rack 174 and lock member 180 to bias lock member 180 toward the plurality of notches 182 and thereby prevent upward movement of the rack 174. As such, the lock member 180 is a one-way locking element. Thus, as the rack 174 is driven downward, lock member 180 travels over the plurality of notches 182 and comes to rest in one of the notches when rack 174 stops moving. The locking of the rack 174 prevents rotation of pinion 165 and effectively locks the end cap 160 to prevent protraction of the seat belt 122 from retractor 120 and its spool. Of course, protraction of the seat belt 122 may still occur due to the twisting or torquing of second force limiting element 154 under loading of the seat belt 122 by the vehicle occupant.

Figure 6:
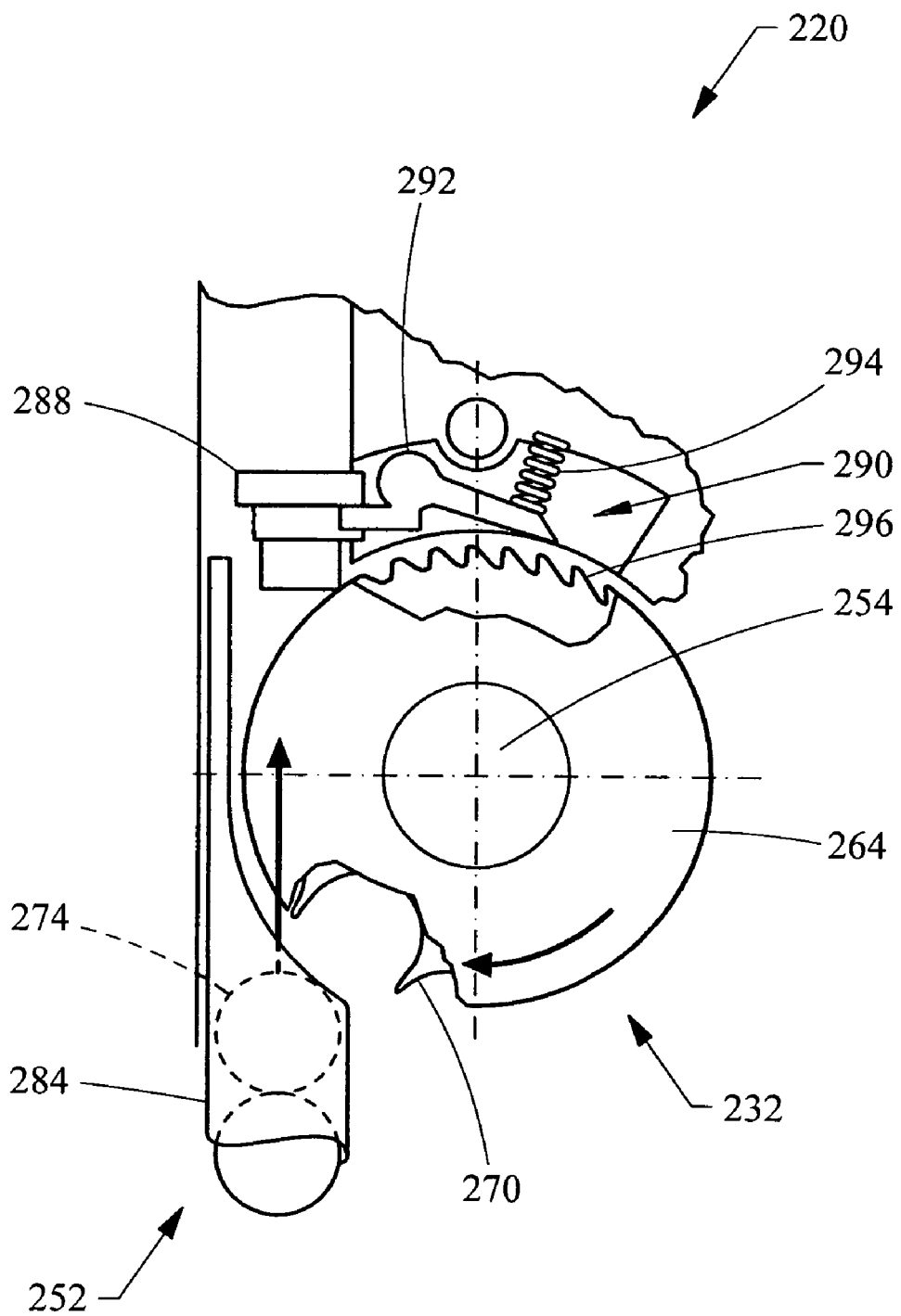
FIG. 6 is a schematic view, partially in cross-section, of yet another embodiment of a retractor constructed in accordance with the teachings of the present invention.

Referring now to FIG. 6, another alternate embodiment of the retractor 220 is shown, schematically, including a different pretensioner device 230, constructed in accordance with the teachings of the present invention. The pretensioner 230 is coupled to a pinion 264, which in turn is connected to the second force limiting element 254. Pinion 264 is rotated by a drive mechanism 252 having pyrotechnic charge (not shown) as in the embodiment above. Here, the drive mechanism induces movement of pretensioner balls 274 through a roto pretensioner tube 284. The pretensioner tube 284 extends along the pinion 264 which includes recesses 270 sized to receive the balls 274. After firing the pretensioner 230, the leading ball 122 rotates the pinion 264 in order to initiate seat belt retraction (pull-in), as indicated by the curved lined arrow.

After passing the pinion 264, the leading ball shears off the retaining tap 288 of pinion lock 290. The retaining tap 288 holds a locking lever 292 in an unlocked position. The shearing off the retaining tap 288 releases the locking lever 292, which in turn is pushed by a lever spring 294 onto a toothed contour 296 of the pinion 265. The geometry of the lever 292 in conjunction with the lever spring 294 allows the pinion 265 to rotate in the pretensioning direction (pull-in) but blocks it in the load limiter direction (webbing protraction or pull-out). As such, the locking lever 292 is a one-way locking element. Of course, protraction of the seat belt may still occur due to the twisting or torquing of second force limiting element 254 under loading of the seat belt by the vehicle occupant.

It will be recognized by those skilled in the art that the retractor of the present invention provides increase adaptability and control over the load limitation characteristics imposed by the retractor and seat belt on an occupant, by providing additional load limitation through a second force limiting element and activation of the pretensioner. Further, the retractor reduces or eliminates "locking dip", which as used in the industry describes the phenomena of loss of belt load when the torque load is transferred from the pretensioner to the blocking element which blocks the profiled head to activate the force limiting element. By activating the pretensioner, and maintaining the activation of the second force limiting element while the first force limiting element is activated through blocking of the tread head, "locking dip" is substantially eliminated.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A retractor for a seat belt restraining system for restraining an occupant of an automobile having a sensor detecting an impact event, the retractor comprising:
   a spool receiving a portion of the seat belt;
   a first force limiting element connected to the spool;
   a locking mechanism operatively connected to the spool through the first force limiting element;
   a second force limiting element connected to the spool;
   a pretensioner having a drive mechanism operatively connected to the spool through the second force limiting element; and
   the retractor operable in at least two modes upon detection of an impact event including,
      a first load limiting mode wherein the locking mechanism is activated to limit belt force through the first force limiting element, and
      a second load limiting mode, wherein the drive mechanism of the pretensioner is activated to retract seat belt onto the spool and blocked to limit force through the second force limiting element, and wherein the locking mechanism is activated to limit belt force through the first force limiting element.

2. The retractor of claim 1, wherein the second load limiting mode includes a pretensioning phase wherein the drive mechanism of the pretensioner rotates the spool, and a load limiting phase wherein the drive mechanism is blocked throughout the entire load limiting phase.

3. The retractor of claim 1, wherein the drive mechanism includes a driven element that, after being driven and rotating the spool, substantially maintains its position throughout the entire impact event.

4. The retractor of claim 1, wherein the second force limiting element absorbs belt force caused by the occupant pressing on the seat belt.

5. The retractor of claim 1, wherein the first load limiting mode provides a low constant load limitation characteristic.

6. The retractor of claim 1, wherein the second load limitation mode provides a high constant load limitation characteristic.

7. The retractor of claim 1, wherein the second load limitation mode provides degressive load limitation.

8. The retractor of claim 1, wherein the first and second force limiting elements are torsion bars that deform under a predetermined load.

9. The retractor of claim 1, wherein the drive mechanism includes a pyrotechnic charge.

10. The retractor of claim 9, wherein the drive mechanism is blocked by maintaining pressure generated by the pyrotechnic charge.

11. The retractor of claim 1, wherein the drive mechanism is an electric motor.

12. The retractor of claim 1, wherein the drive mechanism includes a one-way locking element.

13. The retractor of claim 12, wherein the one-way locking element includes a spring biased lever.

14. The retractor of claim 12, wherein the one-way locking element is activated only upon activation of the drive mechanism of the pretensioner.

15. The retractor of claim 14, wherein the one-way locking element is originally maintained in an unlocked position by a retaining tap, and wherein activation of the drive mechanism causes a moving element to engage the retaining tap and release the one-way locking element to its locked position.

16. A method for restraining an occupant of an automobile having seat belt securing the occupant and a sensor detecting an impact event, and generating a pretension signal, the method comprising:
   providing a retractor having a pretensioner, a spool, a first force limiting element, a second force limiting element, and a locking mechanism, the spool receiving a portion of the seat belt, the first force limiting element operatively connecting the spool and locking mechanism, the pretensioner having a drive mechanism, the second force limiting element operatively linking the spool and drive mechanism;

activating the drive mechanism of the pretensioner based on the pretension signal indicative of an impact event to retract seat belt onto the spool; and maintaining the position of the drive mechanism of the pretensioner throughout the impact event to provide load limitation via the second force limiting element.

17. The method of claim 16, wherein the step of maintaining the position of the drive mechanism includes the second force limiting element absorbing belt force caused by the occupant pressing on the seat belt.

18. The method of claim 16, further comprising the step of activating the locking mechanism to limit belt force through the first load limiting element.

19. The method of claim 16, wherein the step of activating the drive mechanism includes activating a one-way locking element for maintaining the position of the drive mechanism of the pretensioner.

20. A retractor for seat belt restraining system in an automobile having seat belt restraining an occupant and a sensor detecting a potential crash event, the retractor comprising:

a spool receiving a portion of the seat belt;
a first force limiting element connected to the spool;
a locking mechanism operatively connected to the spool through the first force limiting element;
a second force limiting element connected to the spool;
a pretensioner having a drive mechanism and a driven element operatively connected to the spool through the second force limiting element and structured such that movement of the driven element causes rotation of the spool to tension the seat belt; and
the pretensioner including a one-way locking element that is activated only upon initiation of the pretensioner and its drive mechanism, the one-way locking element blocking movement of the driven element of the drive mechanism to prevent rotation of the spool and pay out the seat belt.

21. The retractor of claim 1, wherein the pretensioner includes a driven element responsive to the drive mechanism and structured to cause rotation of the spool to retract the seat belt upon activation of the drive mechanism, and wherein the driven element is blocked after it rotates the spool to limit force through the second force limiting element.

* * * * *